(12) United States Patent
Carlín

(10) Patent No.: US 11,919,717 B2
(45) Date of Patent: Mar. 5, 2024

(54) CONVEYOR APPARATUS HAVING DYNAMIC FRAME COMPONENTS AND METHOD OF USING THE SAME

(71) Applicant: INTELLIGRATED HEADQUARTERS, LLC, Mason, OH (US)

(72) Inventor: Alhelí Espinosa Carlín, Mexico City (MX)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 52 days.

(21) Appl. No.: 17/649,961

(22) Filed: Feb. 4, 2022

(65) Prior Publication Data
US 2023/0249917 A1    Aug. 10, 2023

(51) Int. Cl.
*B65G 17/08*  (2006.01)
*B65G 21/20*  (2006.01)

(52) U.S. Cl.
CPC .......... *B65G 17/08* (2013.01); *B65G 2201/02* (2013.01)

(58) Field of Classification Search
None
See application file for complete search history.

(56) References Cited

U.S. PATENT DOCUMENTS

| | | |
|---|---|---|
| 3,792,785 A | 2/1974 | Weir |
| 7,267,223 B2 * | 9/2007 | Spoors ............... B65G 21/02 198/860.3 |
| 7,950,520 B2 | 5/2011 | Mott |
| 10,315,852 B1 * | 6/2019 | Alspaugh ............... B65G 17/40 |
| 10,414,595 B2 * | 9/2019 | Levine .................. B65G 23/22 |
| 10,494,177 B1 * | 12/2019 | Cioclei .................... B65G 1/10 |

(Continued)

FOREIGN PATENT DOCUMENTS

| | | |
|---|---|---|
| CN | 208470820 U | 2/2019 |
| KR | 10-2019-0121990 A | 10/2019 |
| WO | 2021/191016 A1 | 9/2021 |

OTHER PUBLICATIONS

Bruhl, "Machine guard doors and gates," pp. 1-40, https://www.bruehl-safety.corn/fileadmin/Bruehl-Safety-Doors/02_Englische_Webseite/DoorsSeite/RZ_Maschinenschutztore_engl_ 140905.pdf, [retrieved on Jun. 16, 2023].

(Continued)

*Primary Examiner* — Kavel Singh
(74) *Attorney, Agent, or Firm* — Alston & Bird LLP

(57) ABSTRACT

Various embodiments are directed to a conveyor apparatus comprising: a conveyor frame embodying a structural support for a conveyor surface defining a conveyor length that extends in a length direction and comprises: a first sidewall comprising a first guide track extending along a first inner surface thereof in the length direction, and a second sidewall comprising a second guide track extending along a second inner surface thereof in the length direction; a plurality of bottom panels, each extending between the first sidewall and the second sidewall, wherein a first bottom panel of the plurality of bottom panels is engaged with the first guide track of the first sidewall and the second guide track of the second sidewall such that the first bottom panel is configured to be selectively moveable throughout a range of motion defined at least in part by the first guide track and the second guide track.

19 Claims, 6 Drawing Sheets

(56) References Cited

U.S. PATENT DOCUMENTS 10,766,709 B2 * 9/2020 Smith ................. B65G 21/005
2012/0018283 A1 1/2012 Dallner et al.

OTHER PUBLICATIONS

Dyna Engineering, "Under Conveyor Guards (UGC)," pp. 1-3, https://www.dynaeng.corn.au/dyna/wp-content/uploads/2021/04/DYNA-Engineering-Under-Conveyor-Guards.pdf [retrieved Jun. 15, 2023].
European search report dated Jun. 28, 2023 for EP Application No. 23150241, 13 page(s).

* cited by examiner

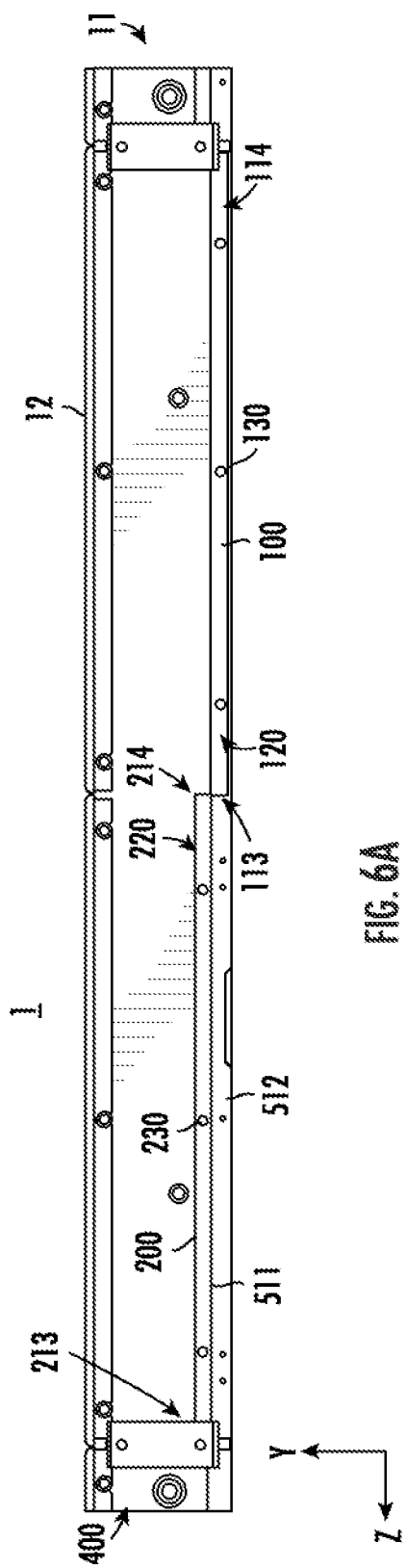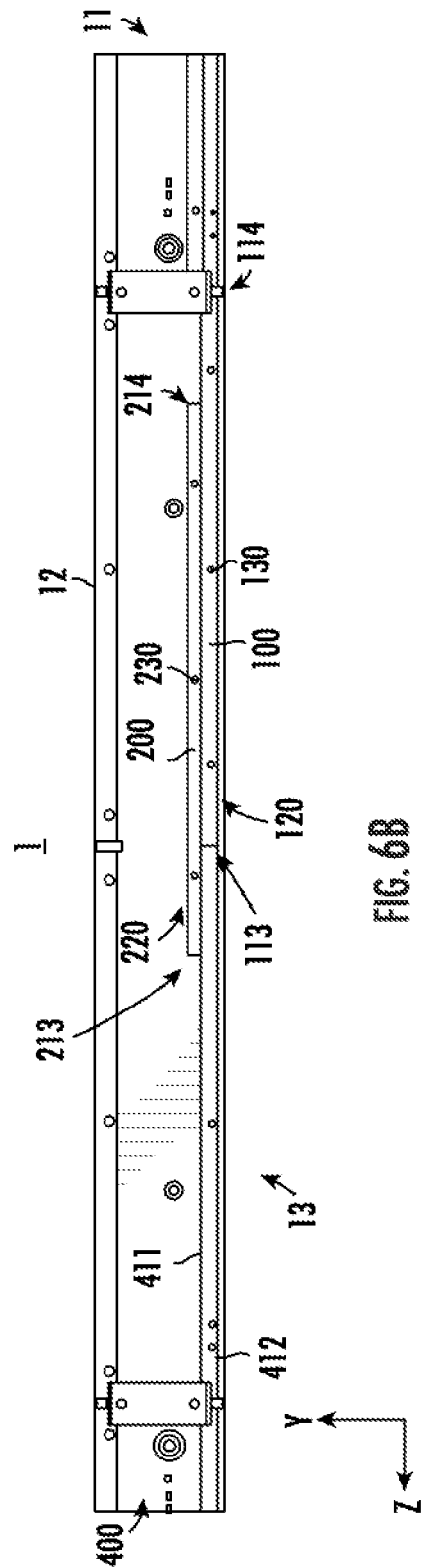

CONVEYOR APPARATUS HAVING DYNAMIC FRAME COMPONENTS AND METHOD OF USING THE SAME

FIELD OF THE INVENTION

Various embodiments described herein relate generally to a material handling systems for handling items, and, more particularly, to conveyor apparatuses configured to facilitate transportation of items along a conveyor surface.

BACKGROUND

Generally, in material handling environments like, but not limited to, distribution centers, warehouses, inventories, or shipping centers, a material handling system can convey, handle, sort, and organize various type of articles (e.g. items, cartons, cases, containers, shipment boxes, totes, packages, and/or the like) using one or more conveyor apparatuses. Through applied effort, ingenuity, and innovation, Applicant has solved problems relating to conveyor apparatuses by developing solutions embodied in the present disclosure, which are described in detail below.

BRIEF SUMMARY

Various embodiments are directed to a conveyor apparatus and method of using the same. In various embodiments, a conveyor apparatus may comprise A conveyor apparatus comprising: a conveyor frame embodying a structural support for a conveyor surface, the conveyor frame defining a conveyor length that extends in a length direction and comprising: a plurality of opposing sidewalls extending in the length direction, including a first sidewall defining a first lateral side of the conveyor frame and comprising a first guide track extending along a first inner surface thereof in the length direction, and a second sidewall defining a second lateral side of the conveyor frame and comprising a second guide track extending along a second inner surface thereof in the length direction; and a plurality of bottom panels, each extending between the first sidewall and the second sidewall, wherein a first bottom panel of the plurality of bottom panels is engaged with both the first guide track of the first sidewall and the second guide track of the second sidewall such that the first bottom panel is configured to be selectively moveable throughout a first range of motion that is defined at least in part by the first guide track and the second guide track.

In various embodiments, the first sidewall further may comprise a third guide track extending along the first inner surface thereof in the length direction and the second sidewall further comprises a fourth guide track extending along the second inner surface thereof in the length direction; and wherein a second bottom panel of the plurality of bottom panels may be engaged with both the third guide track of the first sidewall and the fourth guide track of the second sidewall such that the second bottom panel is configured to be selectively moveable throughout a second range of motion that is defined at least in part by the third guard track and the fourth guide track. In various embodiments, the first guide track and the second guide track may define an upper set of guide tracks that are each positioned at a first height position defined along a height of the opposing sidewalls, and wherein the third guide track and the fourth guide track may define a lower set of guide tracks that are each positioned at a second height position defined along the height of the opposing sidewalls; wherein the upper set of guide tracks and the lower guide tracks are separated by a vertical separation distance.

In various embodiments, the upper set of guide tracks and the lower set of guide tracks may be arranged in an at least substantially parallel configuration such that the first range of motion of the first bottom panel and the second range of motion of the second bottom panel do not intersect. In certain embodiments, the first bottom panel and the second bottom panel may define adjacent bottom panels consecutively arranged along the conveyor length. Further, in various embodiments, a third bottom panel of the plurality of bottom panels may be engaged with both the first guide track of the first sidewall and the second guide track of the second sidewall such that the third bottom panel is configured to be selectively moveable throughout a third range of motion that is defined at least in part by the first guard track and the second guide track; wherein the third range of motion comprises an at least substantially coplanar confirmation relative to the first range of motion of the first bottom panel.

In various embodiments, the conveyor apparatus may further comprise a bottom panel release element that is configured for selectively reconfiguring the first bottom panel between a fixed configuration and a dynamic configuration. In certain embodiments, the bottom panel release element may be arranged along the conveyor frame so as to be accessible for adjustment between an engaged configuration and a disengaged configuration via a first outer surface of the first sidewall. Further, in various embodiments, the conveyor apparatus may further comprise a second bottom panel release element that is configured for selectively reconfiguring the first bottom panel between the fixed configuration and the dynamic configuration, wherein the second bottom panel release is arranged along the conveyor frame so as to be accessible for adjustment via a second outer surface of the second sidewall.

In various embodiments, the conveyor apparatus may further comprise a bottom panel release element that is configured for selectively reconfiguring the first bottom panel between a fixed configuration and a dynamic configuration. In certain embodiments, the bottom panel release element may be arranged along the conveyor frame so as to be accessible for adjustment between an engaged configuration and a disengaged configuration via a first outer surface of the first sidewall. Further, in various embodiments, the conveyor apparatus may further comprise a second bottom panel release element that is configured for selectively reconfiguring the first bottom panel between the fixed configuration and the dynamic configuration, wherein the second bottom panel release is arranged along the conveyor frame so as to be accessible for adjustment via a second outer surface of the second sidewall.

In various embodiments, the conveyor frame may define an intermediate conveyor section of the conveyor apparatus. In various embodiments, the first range of motion may be defined in the length direction along respective lengths of the first sidewall and the second sidewall. In various embodiments, the first guard track may be defined at least in part by a first track length and the second guard track is defined at least in part by a second track length, the first and second track lengths each being at least substantially parallel to the conveyor surface. Further, in various embodiments, the first guard track and the second guard track may comprise an at least substantially mirrored configuration relative to one another. In various embodiments, the first bottom panel may comprise a plurality of sidewall engagement elements configured to facilitate dynamic engagement of the first bottom panel with the first guide track and the second guide track, wherein each of the sidewall engagement elements is configured to engage one of the first guide track and the second guide track. In certain embodiments, the plurality of sidewall engagement elements may comprise a first set of sidewall engagement elements disposed along a first lateral side of the first bottom panel and configured for engaging the first guide track, and a second set of sidewall engagement elements disposed along a second lateral side of the first bottom panel and configured for engaging the second guide track. In certain embodiments, each of the plurality of sidewall engagement elements may comprise a roller element configured to define a rolling engagement of the respective sidewall engagement element along the respective one of the first guide track and the second guide track engaged therewith.

In various embodiments, the first guide track may comprise a first bottom surface extending in a first laterally inward direction at least substantially perpendicularly from the first inner surface of the first sidewall, and the second guide track comprises a second bottom surface extending in a second laterally inward direction at least substantially perpendicularly from the second inner surface of the second sidewall; wherein the first laterally inward direction and the second laterally inward direction are at least substantially opposite directions. In certain embodiments, the first guide track may comprise a side surface extending in an at least substantially upward vertical direction from the first bottom surface, the side surface being configured to at least partially constrain a lateral range of motion of the first bottom panel relative to the first sidewall. In various embodiments, the first bottom panel may be configured for bi-direction movement relative to the first sidewall and the second sidewall in both a first length direction and a second length direction defined along the conveyor length, the first length direction and the length inward direction defining at least substantially opposite directions. In various embodiments, the first bottom panel may comprise a bottom panel frame comprising an at least substantially rectangular configuration.

BRIEF DESCRIPTION OF THE DRAWINGS

Reference will now be made to the accompanying drawings, which are not necessarily drawn to scale, and wherein:

FIGS. 6A and 6B illustrate side cross-sectional views of an exemplary conveyor apparatus according to an exemplary embodiment described herein.

DETAILED DESCRIPTION

Figure 1:
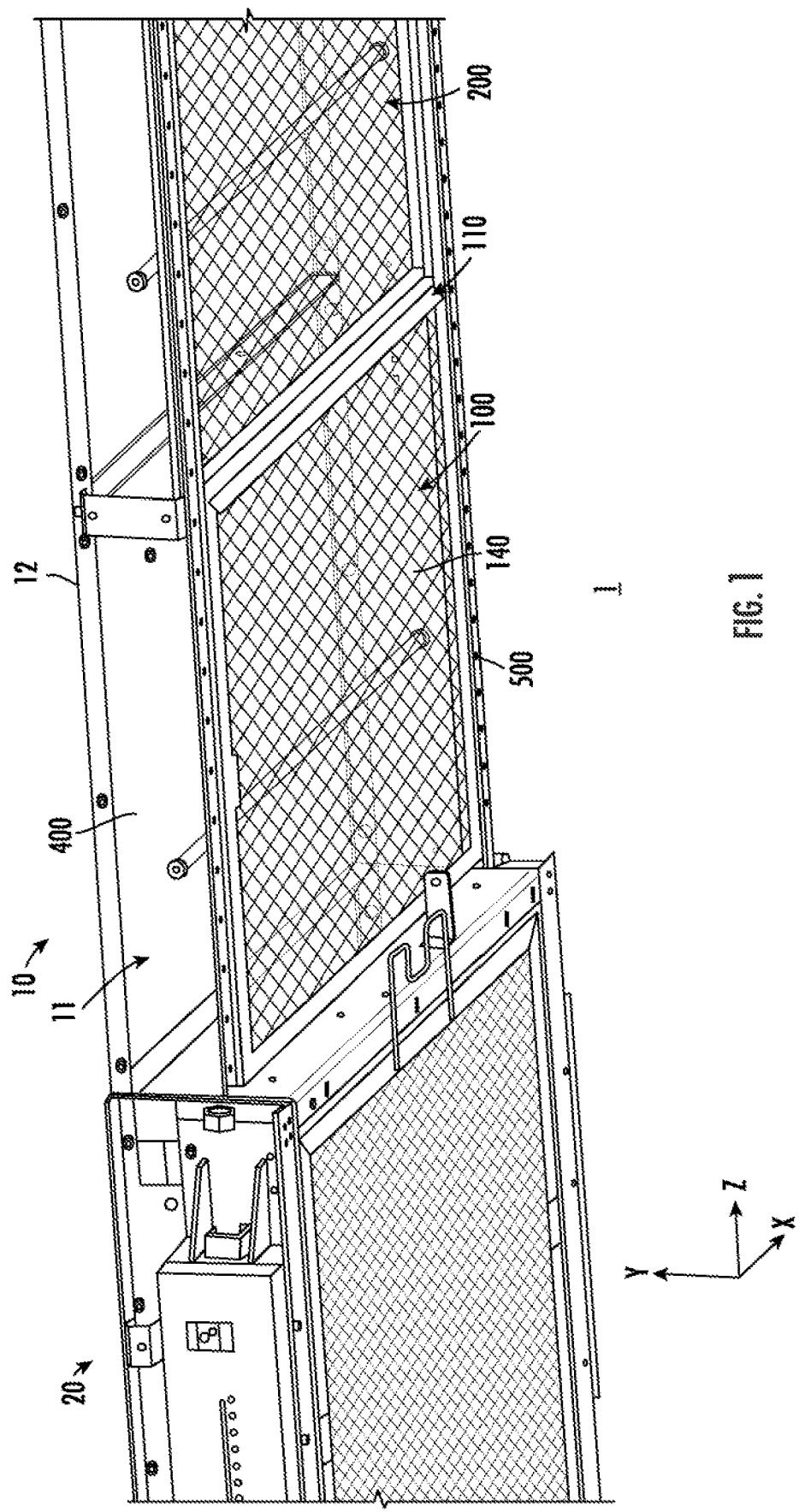
FIG. 1 illustrates a bottom perspective view of an exemplary conveyor apparatus according to an exemplary embodiment described herein.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

As used herein, directional terms used to describe a component, configuration, action, position, direction, and/or the like (e.g., "rearward," "an upward vertical direction," laterally outward," "bottom," "top," and the like) are meant to be interpreted relative to a hypothetical conveyor apparatus provided on an at least substantially flat horizontal surface, but the terms are not to be interpreted as requiring the conveyor apparatus to be in this orientation at any particular time.

Conveyor apparatuses may be used in, for example, industrial manufacturing and packaging applications to facilitate the transportation of objects to a desired delivery location within a factory or a warehouse. For example, conveyor apparatuses can include a conveyor surface that extends along a length of the conveyor apparatus and supports items disposed thereon as the items are transported along a conveyor travel path towards a destination location. Further, conveyor apparatuses may comprise a conveyor frame that may include various structural components such as, for example, sidewalls, panels, and/or the like that are assembled relative to one another to provide a frame capable of supporting the conveyor surface along the length of the apparatus. For example, various conveyor apparatuses can include one or more bottom panels provided along a bottom side of an intermediate conveyor section to prevent unauthorized and/or unintended access to a bottom side of the conveyor surface, an internal portion of the conveyor apparatus, various controls and mechanisms housed within the frame of the conveyor apparatus, and/or the like.

Various conveyor apparatuses comprise bottom panels that are configured to be fully removeable from the conveyor frame. In such conveyor apparatuses, in order to access the internal portion of the conveyor, one or more bottom panels of the conveyor frame must be fully detached (e.g., uninstalled) from the frame. For example, such configurations may require at least two people, such as, for example, maintenance or other service personnel, to fully remove the bottom panel from the frame, often requiring multiple fastening components such as pins, bolts, and/or the like positioned on each side of the conveyor frame to be removed from the frame while the bottom panel is simultaneously held in a stabilized position to prevent the bottom panel from falling to the ground below. Such an exercise of may require a large number of tools and/or personnel to be executed, and may be a time-consuming operation that results in undesirably high costs associated with labor and/or operational downtime. Further, such conveyor apparatuses may require installation hardware associated with the bottom panels that prevents the bottom panels from being pre-assembled into the conveyor frame prior to shipment. Having to assemble the bottom panels within the conveyor frame upon receipt thereof can impose additional costs associated with labor and downtime on a consumer. Further, various conveyor apparatuses bottom panels can have hinged connections relative to another component of the conveyor frame, such as, for example, a frame sidewall. Such hinged bottom panel configurations may include a variety of hinge and/or locking mechanisms that collectively may result in a complex opening operation that requires an undesirably large number of actions to be executed in order for the bottom panel to be opened. For example, such conveyor apparatuses may include a plurality of locks distributed at various locations along the conveyor frame that, once disengaged, may cause the unhinged bottom panel portion to be immediately released, creating a potentially dangerous condition wherein a heavy bottom panel is freely swinging beneath an intermediate section of the conveyor frame. Those same complexities are present during the process of having to reinstall the hinged bottom panel into the conveyor frame. Further still, various conveyor apparatuses may comprise conveyor frames with bottom surfaces that are positioned close to the ground, making the incorporation of the above-described removable bottom panel components extremely difficult and/or practically not feasible, and often resulting in the conveyor frame being configured without any bottom panels, which can result in an extremely dangerous operational condition.

Various embodiments described herein are directed to conveyor apparatuses that comprise a conveyor frame having at least one bottom panel that is configured to be selectively moveable along the length of the conveyor apparatus relative to the sidewalls of the conveyor frame. As described herein, an exemplary conveyor frame may include two opposing sidewalls defining respective lateral sides of the conveyor frame, each comprising at least one guide track extending along an inner surface thereof in a length direction. An exemplary conveyor apparatus may include at least one bottom panel that is configured to dynamically engage each of the guide tracks provided along the opposing sidewalls such that the bottom panel is configured for selective movement (e.g., sliding, rotating, shifting, translating, and/or otherwise traveling) along the length of the respective guide tracks. For example, as described herein, such an exemplary bottom panel comprising a dynamic configuration relative to the opposing sidewalls of the conveyor frame may remain positioned between the two opposing sidewalls as the panel is reconfigured between a closed configuration and an open configuration by being moved throughout a range of motion that is defined by the guide tracks along the inner sidewall surfaces.

In various embodiments, an exemplary conveyor apparatus may include a conveyor frame wherein each of the opposing sidewalls comprises a plurality of guide tracks extending in an at least substantially parallel configuration along the length of the respective sidewall, including an upper guide track and a lower guide track. As described herein, the present invention may comprise a conveyor apparatus having a plurality of bottom panels that comprise a dynamic configuration relative to the sidewalls of the conveyor frame such each bottom panel consecutively arranged a length of the conveyor apparatus may be selectively moved (e.g., shifted) in the length direction independently of the other bottom panels. For example, the conveyor frame may be configured such that a first bottom panel is dynamically engaged with each of the respective upper guard tracks provided along the inner surfaces of the opposing sidewalls, and a second bottom panel positioned adjacent the first bottom panel is dynamically engaged with each of the respective lower guard tracks provided along the inner surfaces of the opposing sidewalls. In such an exemplary configuration, each of the first bottom panel and the second bottom panel may be moveable along respective ranges of motion defined by the upper guide tracks and the lower guide tracks, respectively, such that they each may be reconfigured between open and closed configurations without being subjected to physical interference caused by the adjacent bottom panel disposed along another set of guide tracks. Further, as described herein, the present invention includes a conveyor apparatus that may comprise a bottom panel release element that is configured for selectively reconfiguring the first bottom panel between a fixed configuration and a dynamic configuration, and may be arranged about the conveyor frame so as to be accessible via an outer surface of a conveyor frame sidewall. The present invention further includes a conveyor frame that is defined by a plurality of bottom panels that may be installed within the conveyor frame using components that may be contained within the frame such that the bottom side of the conveyor frame defined by the plurality of bottom panels embodies an at least substantially flat surface. Such an exemplary surface may facilitate the stacking of various apparatuses and/or frames in a shipping context, which may enable apparatus pre-assembly and/or promote simplified shipping solutions. Further, the present invention includes a conveyor apparatus comprising dynamically configured bottom panels that, as described herein, may represent a simplified bottom panel reconfiguration operation that is defined by minimized labor costs, simplified operations, and a reduction of the hazardous conditions that may be associated with accessing the internal portion of a conveyor apparatus.

A conveyor apparatus may be configured to facilitate the transportation of one or more objects along a conveyor travel path that is defined along the length of the conveyor apparatus to a desired downstream location. For example, FIG. 1 illustrates a bottom perspective view of an exemplary conveyor apparatus configured in accordance with an example embodiment. As illustrated, an exemplary conveyor apparatus 1 may comprise a conveyor surface 12 extending along a length of the conveyor apparatus in a length direction (e.g., in the z-direction as illustrated in FIG. 1) and a conveyor frame 11 configured to extend along the length of the conveyor apparatus and provide structural support for the conveyor surface 12 (e.g., a plurality of rollers, a belt assembly, and/or the like) and other conveyor components so as to define a conveyor travel path thereof along. In various embodiments, an exemplary conveyor apparatus 1 may comprise a conveyor surface 12 defined by a top surface (e.g., a planar surface collectively defined by a plurality of rollers) configured to support one or more objects disposed thereon and facilitate the transportation of the one or more objects along the conveyor travel path. For example, the conveyor travel path may be defined along the length of the conveyor surface 12 of the conveyor apparatus 1. In various embodiments, the conveyor surface 12 may comprise motorized drive rollers, a belt conveyor, and/or any other conveying means configured for moving an object disposed thereon along the conveyor travel path towards a destination location.

As described, in various embodiments, a conveyor apparatus 1 may further comprise a conveyor frame 11 that provides structural support for the conveyor surface 12 along the length of the conveyor apparatus 1 (e.g., in the z-direction as illustrated in FIG. 1). In various embodiments, a conveyor frame 11 may comprise two opposing sidewalls, such as, for example, a first sidewall 400 and a second sidewall 500 provided on opposing lateral sides of the conveyor surface 12. The first sidewall 400 and the second sidewall 500 of the conveyor frame 11 may each have a sidewall length defined in the length direction defined along the length of the conveyor apparatus 1, such as, for example, in the z-direction as illustrated in FIG. 1, and a sidewall height that is defined between a top sidewall portion and a bottom sidewall portion thereof in a height direction, which may be a vertical direction at least substantially perpendicular to the length direction, such as, for example, the y-direction as illustrated in FIG. 1. In various embodiments, the first and second sidewalls 400, 500 may each be configured to receive and/or support a respective lateral side of the conveyor surface 12 (e.g., a respective lateral side of each of a plurality of rollers defining the conveyor surface 12) such that the width of conveyor surface 12 extends laterally between the respective top sidewall portions of the first and second sidewalls 400, 500. For example, the lateral width of the conveyor surface 12 may be defined in a lateral direction that is at least substantially perpendicular to the length direction, such as, for example, the x-direction as illustrated in FIG. 1.

In various embodiments, a conveyor frame 11 may further comprise at least one bottom panel 100 defining a bottom surface of the conveyor frame 11 that is configured to provide coverage over at least a portion of a bottom side of the conveyor apparatus so as to prevent unwanted (e.g., unauthorized) access to the internal portion of the conveyer apparatus (e.g., beneath the conveyor surface and in between the two opposing sidewalls of the conveyor frame) and/or the various conveyor components disposed therein. As illustrated in FIG. 1, an exemplary bottom panel 100 of a conveyor frame 11 may have a bottom panel width that extends laterally between the two opposing sidewalls 400, 500 of the conveyor frame 11. For example, the conveyor frame 11 may be arranged such that the bottom panel width of each bottom panel 100 extends laterally between respective bottom sidewall portions of the first and second sidewalls 400, 500. In various embodiments, a conveyor frame 11 of an exemplary conveyor apparatus 1 may comprise a plurality of bottom panels 100, 200 arranged consecutively along the length of the conveyor apparatus such that when the conveyor frame is arranged in a closed position, as described in further detail herein, the bottom panel length of each of the plurality of bottom panels defines a respective portion of the length of the conveyor apparatus. As described in further detail herein, at least one bottom panel 100 of the plurality of bottom panels 100, 200 disposed between the opposing sidewalls 400, 500 of the conveyor frame 11 may be configured for movement along the length of the conveyor apparatus 1 (e.g., in one or more z-directions, as illustrated) such that the at least one bottom panel 100 may be selectively moved in the length direction relative to at least a portion of the other bottom panels of the plurality (e.g., bottom panel 200).

In various embodiments, the conveyor 10 may comprise a plurality of conveyor sections, each respectively extending along a portion of the conveyor length of the conveyor apparatus 1 so as to define a respective portion of the conveyor travel path. For example, as illustrated in FIG. 1, an exemplary conveyor apparatus 1 may comprise an end conveyor section 20 configured to be positioned at a beginning and/or an end of one or more conveyer travel paths, or, additionally, and/or alternatively, at an intersection of two or more conveyor travel paths within a conveyor system. Further, an exemplary conveyor apparatus 1 may comprise an intermediate section 10 configured to extend in an at least substantially linear direction between a first and second sections of the conveyor apparatus 1. In various embodiments, an exemplary conveyor apparatus 1 may comprise a plurality of intermediate sections 10 arranged at least substantially adjacent one another (e.g., consecutively) between the first and second end sections 20 thereof, each comprising respective conveyor surface such that the intermediate sections 10 collectively provide an at least substantially continuous conveyor surface 12 extending between the first and second end sections 20.

Figure 2A:
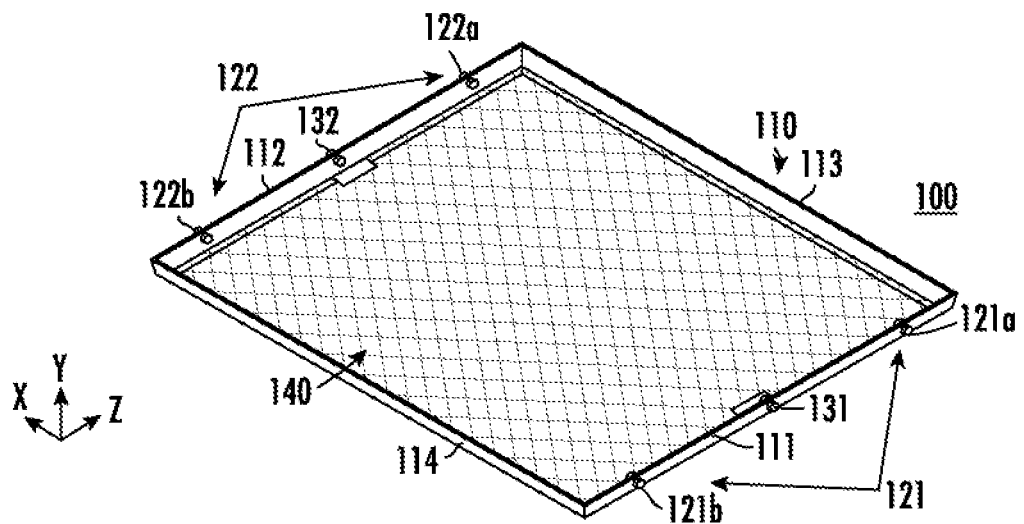
FIGS. 2A and 2B illustrate a various perspective views of an exemplary conveyor bottom panel according to an exemplary embodiment described herein.
Figure 2B:
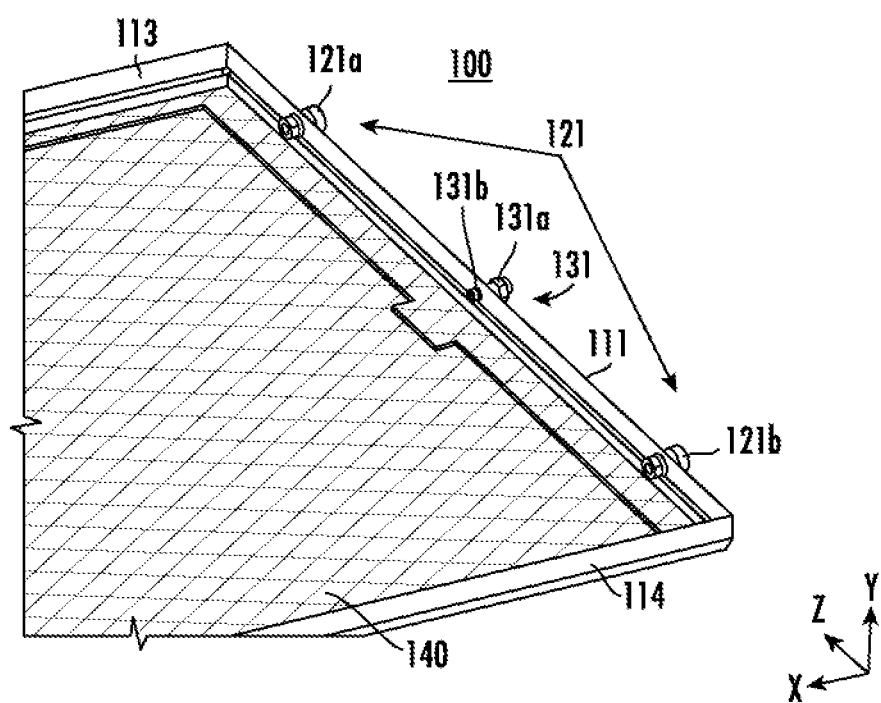

FIGS. 2A and 2B illustrate a various perspective views of an exemplary conveyor bottom panel according to an exemplary embodiment described herein. In particular, FIG. 2A illustrates an exemplary conveyor bottom panel 100 comprising a bottom panel frame 110, a bottom panel cover 140, one or more bottom panel release elements 131, 132, and a plurality of sidewall engagement elements comprising a first set of sidewall engagement elements 121 and a second set of sidewall engagement elements 122, each configured for engaging a respective guide track provided along an interior surface of the first and second sidewalls of the conveyor frame, respectively, and for selectively moving (e.g., sliding, rotating, shifting, translating, and/or otherwise traveling) along the length of the respective guide track to enable the dynamic configuration of the bottom panel 100 relative to the first and second sidewalls, as described herein.

In various embodiments, an exemplary bottom panel 100 may comprise a bottom panel frame 110 that comprises one or more frame elements arranged to define an outer perimeter of the bottom panel 100. For example, as illustrated, an exemplary bottom panel frame 110 may comprise a plurality of frame elements arranged in an at least substantially rectangular configuration, including a first later side frame element 111 and a second lateral side frame element 112 defining opposing lateral sides of the bottom panel frame 110 such that a panel width of the bottom panel 100 is defined therebetween (e.g., measured perpendicularly between the first and second lateral side frame elements 111, 112 in the x-direction, as illustrated). The bottom panel 100 may be configured for positioning within a conveyor frame of an exemplary conveyor apparatus such that each of the lateral side frame elements 111, 112 may be arranged at least substantially adjacent a respective one of the opposing sidewalls of the conveyor frame. In various embodiments, as illustrated, the plurality of frame elements of the bottom panel frame 110 may further comprise a front frame element 113 extending perpendicularly between the first and second lateral side frame elements 111, 112 so as to define a front side of the bottom panel frame 110, and a rear frame element 114 extending perpendicularly between the first and second lateral side frame elements 111, 112 so as to define a rear side of the bottom panel frame 110, the rear side of the bottom panel frame 110 being opposite the front side as defined in a length direction along the first and second lateral side frame elements 111, 112 (e.g., in a y-direction, as illustrated).

Further, an exemplary bottom panel 100 may comprise a bottom panel cover 140 comprising an at least substantially planar component (e.g., a material sheet and/or the like) that embodies a physical barrier extending throughout an internal area defined within the outer perimeter of the plurality of frame elements of the bottom panel frame 110 to function to prevent unwanted (e.g., unauthorized) access to the internal portion of the conveyor apparatus via the internal area defined within the bottom panel frame 110. For example, the bottom panel cover 140 may be secured to the bottom panel frame 110 such that, upon the exemplary bottom panel 100 being installed within the conveyor apparatus between the two opposing sidewalls of the conveyor frame (e.g., via the first and second lateral side frame elements 111, 112 of the bottom panel frame 110), as described herein, the bottom panel cover 140 may provide coverage over at least a portion of the bottom side of the conveyor apparatus based at least in part on the position of the bottom panel 100 along the conveyor length. In various embodiments, an exemplary bottom panel 100 may comprise a bottom panel cover 140 defined by an at least substantially rigid material, such as, for example, a plastic material, a composite material (e.g. fiber glass, carbon fiber with resin), a metal material (e.g., an expanded metal material), a wood material, a rigid fibrous material (e.g., a recycled compacted carton material), and/or the like, or any other suitable material capable of being secured relative to a bottom panel frame and providing at least partial physical coverage over the area defined within the outer perimeter of the frame.

In various embodiments, an exemplary bottom panel 100 may further comprise a plurality of sidewall engagement elements extending from opposing lateral sides of the bottom panel frame 110 (e.g., distributed along each of the first and second lateral side frame elements 111, 112) that are configured to engage at least a portion of the opposing sidewalls of the conveyor frame so as to define a dynamic engagement of the bottom panel 100 relative to the opposing sidewalls in one or more directions (e.g., in a length direction). In various embodiments, each of the plurality of sidewall engagement elements (e.g., the first and second sets of sidewall engagement elements 121, 122) may be configured for engaging a guide track of one of the conveyor frame sidewalls via a rolling engagement, sliding engagement, and/or any other means of dynamic engagement and/or connection that is suitable for enabling the movement of the sidewall engagement element along a track length of the guide track. As non-limiting illustrative examples, an exemplary sidewall engagement element may comprise a wheel, a roller, a pin, a bearing, and/or the like, or any other suitable mechanical means configured for sliding, rotating, shifting, translating, and/or otherwise traveling along the length of a respective guide track to facilitate the movement of the bottom panel engaged therewith in a length direction relative to the sidewall comprising the guide track. As described herein, the plurality of sidewall engagement elements of an exemplary bottom panel 100 may facilitate the dynamic configuration of the bottom panel 100 relative to the first and second sidewalls, wherein the moveable configuration of the first and second sets of sidewall engagement elements 121, 122 relative to the respective guide tracks engaged therewith enables the exemplary bottom panel 100 to be selectively moved along the length of the conveyor apparatus (e.g., relative to the first and second sidewalls).

In various embodiments, for example, as illustrated in FIG. 2A, the plurality of sidewall engagement elements of an exemplary bottom panel 100 may comprise a first set of sidewall engagement elements 121 distributed along the first lateral side frame element 111, and a second set of sidewall engagement elements 122 distributed along the second lateral side frame element 112. For example, the bottom panel 100 may be positioned such that the first set of sidewall engagement elements 121 may engage a guide track provided along an interior surface of the first sidewall of the conveyor frame and the second set of sidewall engagement elements 122 may engage a guide track provided along an interior surface of the second sidewall of the conveyor frame, as described herein. In various embodiments, a set of sidewall engagement elements may comprise a plurality of sidewall engagement elements, such as, for example, a first sidewall engagement element and a second sidewall engagement element, that are each at least partially secured at a respective position along a lateral side frame element of an exemplary bottom panel. For example, in various embodiments, one or more of the plurality of sidewall engagement elements may be fixedly secured within a lateral side frame element (e.g., a first lateral side frame element 111) so as to be constrained against both linear motion and rotational motion relative to the lateral side frame element. Alternatively, or additionally, in various embodiments, one or more of the plurality of sidewall engagement elements may be partially secured within a lateral side frame element (e.g., a first lateral side frame element 111) so as to be constrained against linear motion relative to the lateral side frame element (e.g., in the x-, y-, and z-directions) while having a full range of rotational motion about a rotational axis defined by the central axis of the sidewall engagement element in order to facilitate the dynamic engagement of the sidewall engagement element along the guide track.

In various embodiments, as shown, each of the plurality of sidewall engagement elements of a set (e.g., first set of sidewall engagement elements 121) may extend from a lateral side frame element in an outward lateral direction perpendicularly away from the lateral side frame element to which the element is connected. Such an exemplary configuration may enable the sidewall engagement elements to engage a guide track provided along an inner face of a sidewall without the sidewall and/or the guide track being physically engaged by the corresponding lateral side frame element. For example, as illustrated, a first set of sidewall engagement elements 121 may comprise a first front sidewall engagement element 121a and a first rear sidewall engagement element 121b extending from a front portion of the first lateral side frame element 111 and a rear portion of the first lateral side frame element 111, respectively, in outward lateral directions away from the first lateral side frame element 111 (e.g., in the negative x-direction, as illustrated). In various embodiments, the distribution of the first front sidewall engagement element 121a and the first rear sidewall engagement element 121b along the length of the first lateral side frame element 111 may be at least substantially symmetrical over a frame element midpoint (e.g., as measured in the length direction) such that the first front sidewall engagement element 121a and the first rear sidewall engagement element 121b are equidistant from the frame element midpoint. Further, a second set of sidewall engagement elements 122 may comprise a second front sidewall engagement element 122a and a second rear sidewall engagement element 122b extending from a front portion of the second lateral side frame element 112 and a rear portion of the second lateral side frame element 112, respectively, in outward lateral directions away from the second lateral side frame element 112 (e.g., in the positive x-direction, as illustrated). In various embodiments, the distribution of the second front sidewall engagement element 122a and the second rear sidewall engagement element 122b along the length of the second lateral side frame element 112 may be at least substantially symmetrical over a frame element midpoint (e.g., as measured in the length direction) such that the second front sidewall engagement element 122a and the second rear sidewall engagement element 122b are equidistant from the frame element midpoint.

In various embodiments, the position of each of the plurality of exemplary sidewall engagement elements along the length of the respective lateral side frame elements within which it is disposed may be based on the positioning of a corresponding orifice arranged along the length of the respective lateral side frame element that extends laterally through a surface of the lateral side frame element and is configured to receive and/or at least partially secure a sidewall engagement element therein, as described herein. For example, in the illustrated exemplary embodiment, the bottom panel frame 110 may comprise a first front lateral orifice and a first rear lateral orifice extending laterally through a front portion and a rear portion, respectively, of the first lateral side frame element 111, as well as a second front lateral orifice and a second rear lateral orifice extending laterally through a front portion and a rear portion, respectively, of the second lateral side frame element 112, each of which are configured to receive a respective sidewall engagement element of the plurality, as described herein.

Figure 3:
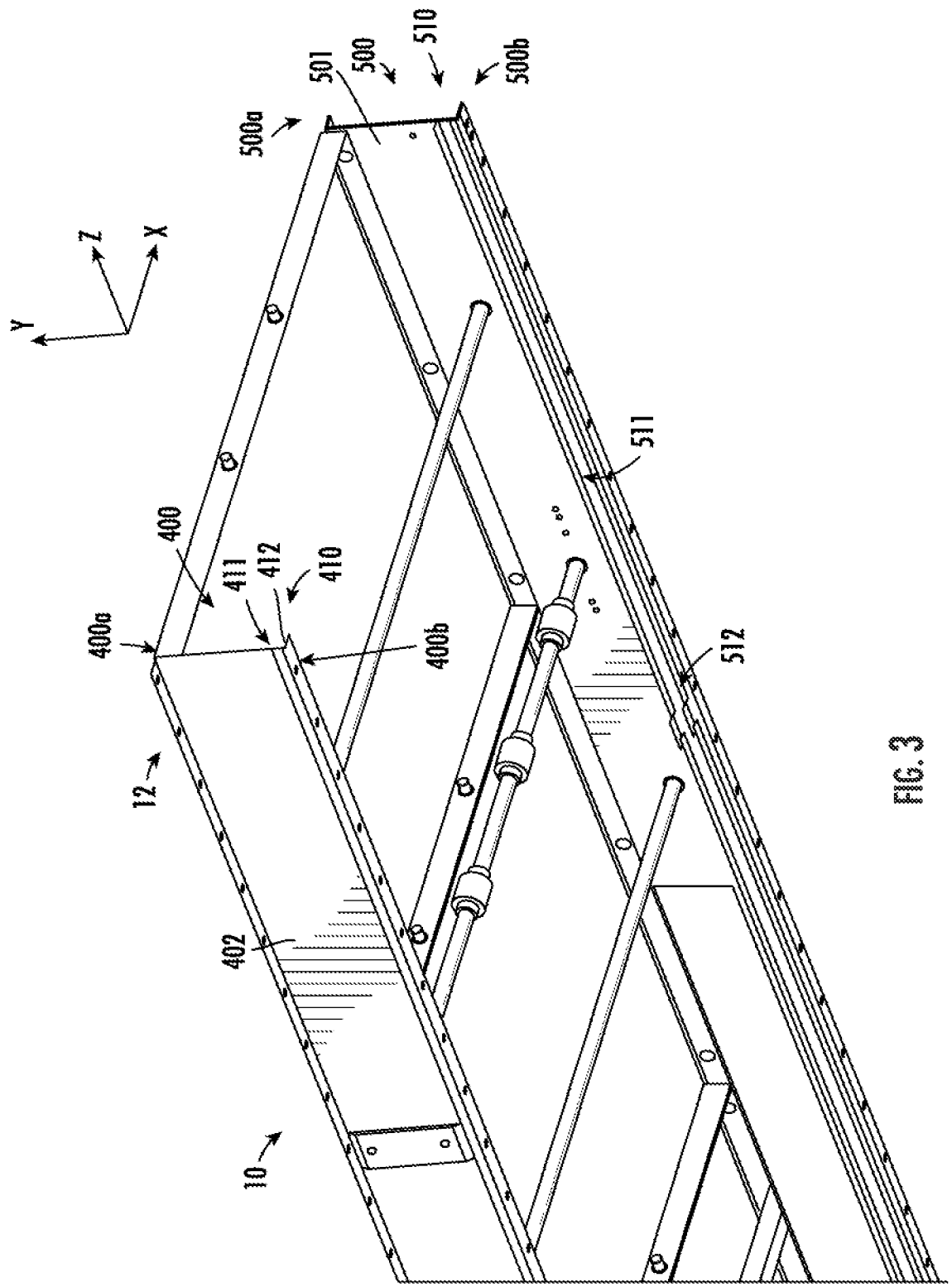
FIG. 3 illustrates an isolated bottom perspective view of various components of an exemplary conveyor apparatus according to an exemplary embodiment described herein.

In various embodiments, as illustrated in FIG. 3, an exemplary sidewall of the conveyor frame of an exemplary conveyor apparatus, such as, for example, the second sidewall 500, may comprise at least one guide track that extends in a length direction along the inner surface of the sidewall and is configured for engagement with at least one bottom panel (e.g., via a set of sidewall engagement elements). As illustrated, the at least one guide track 510 of the second sidewall 500 may be provided at an inner surface 501 of the sidewall 500 in a position at least substantially adjacent the bottom sidewall portion 500b of the sidewall 500. For example, the at least one guide track 510 may be positioned at least substantially adjacent the bottom sidewall portion 500b such that an exemplary bottom panel with sidewall engagement elements disposed on the at least one guide track 510 is positioned along bottom side of the conveyor frame 11 (e.g., opposite the conveyor surface 12 positioned adjacent a top sidewall portion 500a). In various embodiments, each of the at least one guide track 510 may be defined at least in part by a track length that extends along the length of the second sidewall 500 in a direction that is at least substantially parallel to the length of the conveyor surface 12 (e.g., in a z-direction, as illustrated), such that the position of each of the at least one guide track 510 relative to the height of the second sidewall 500 (e.g., defined in the y-direction, as illustrated) remains at least substantially the same throughout the length of the respective guide track.

In various embodiments, an exemplary guide track provided along an inner surface of a sidewall of the conveyor frame may comprise at least one surface configured to receive a sidewall engagement element of an exemplary bottom panel, as described herein. For example, in various embodiments, a guide track of the at least one guide track 510 extending along the inner surface 501 of the second sidewall 500 may comprise a bottom surface, defined at least in part by a width extending perpendicularly away from the inner surface 501 in a laterally inward direction (e.g., in the negative x-direction, as illustrated), upon which a sidewall engagement element of a bottom panel may be disposed. Further, in various embodiments, an exemplary guide track of the at least one guide track 510 may further comprise a side surface extending in an at least partially upward direction from the guide track bottom surface so as to define an internal channel between the side surface and the inner surface 501 that is configured for receiving a sidewall engagement element and restricting the lateral movement thereof in one or more lateral directions. As non-limiting illustrative examples, an exemplary guide track may have a cross-sectional profile that is at least substantially flat (e.g., a single bottom surface extending perpendicularly away from the inner surface of the sidewall), "L"-shaped, "U"-shaped, and/or any other shape configured to receive a sidewall engagement element and enable the sidewall engagement element to operably travel (e.g., shift, rotate, slide, and/or otherwise move) along the length thereof.

In various embodiments, the first and second sidewalls 400, 500 of an exemplary conveyor frame may each comprise at least one guide track that corresponds to the at least one guide track of the opposing sidewall. For example, as illustrated, in an exemplary embodiment wherein the first sidewall 400 comprises at least one guide track 410 and the second sidewall 500 comprises at least one guide track 510, the configuration of the at least one guide track 410 relative to the first sidewall 400 (e.g., the position of the guide track along the height of the sidewall, the angular configuration of the guide track as it extends along the sidewall length, and/or the like) may be at least substantially similar to the configuration of the at least one guide track 510 relative to the second sidewall 500. That is, the at least one guide track 410 provided along an inner surface of the first sidewall 400 and the at least one guide track 510 provided along the inner surface 501 of the second sidewall 500 may comprise an at least substantially mirrored configuration relative to one another. For example, each guide track of the at least one guide tracks 510 of the second sidewall 500 may comprise a mirrored configuration relative to a corresponding guide track of the at least one guide track 410 of the first sidewall 400 such that each of the at least one guide tracks 510 is positioned at substantially the same height position along the conveyor frame as the corresponding guide track of the at least one guide track 410 (e.g., as measured in the y-direction), and, further, is arranged in an at least substantially parallel configuration relative to the corresponding guide track of the at least one guide track 410. In such an exemplary configuration, a first guide track of the at least one guide track 410 and a corresponding second guide track of the at least one guide track 510 may each be configured for engagement with an exemplary bottom panel such that the movement (e.g., shifting, translating, and/or the like) of the bottom panel along the length of the conveyor apparatus relative to the opposing sidewalls 400, 500 is enabled by the dynamic engagement of the bottom panel's lateral sides (e.g., the plurality of sidewall engagement elements distributed therealong, as described herein) along the first and second guide tracks, respectively, and is defined by the travelling of each of the lateral sides along the respective one of the corresponding guide tracks engaged therewith. For example, corresponding guide tracks of the first sidewall 400 and the second sidewall 500 may be collectively configured such that an exemplary bottom panel engaged with each of the corresponding guide tracks may maintain an at least substantially parallel configuration relative to the conveyor surface 12 as the bottom panel is moved throughout a bottom panel range of motion defined along at least a portion the length of the conveyor apparatus.

In various embodiments, the at least one guide track of a sidewall of an exemplary conveyor frame, such as, for example, the at least one guide track 410 of the first sidewall 400 or the at least one guide track 510 of the second sidewall 500, may comprise a plurality of guide tracks, including an upper guide track and a lower guide track. For example, as illustrated in FIG. 3, the at least one guide track 510 of the second sidewall 500 may comprise an upper guide track 511 and a lower guide track 512. In such an exemplary circumstance, an upper guide track 511 and a lower guide track 512 may each extend along the inner surface 501 of the sidewall 500 in a respective position that is at least substantially adjacent the bottom sidewall portion 500b of the sidewall 500. As illustrated, the upper guide track 511 and the lower guide track 512 may be arranged along the inner surface 501 in a vertically stacked configuration, wherein the upper guide track 511 is positioned above the lower guide track 512 such that the guide tracks 511, 512 are separated by a vertical separation distance along the height of the sidewall 500 (e.g., in the y-direction, as illustrated). Further, in various embodiments, the upper guide track 511 and the lower guide track 512 may be arranged in an at least substantially parallel configuration relative to one another, such that the vertical separation distance defined therebetween is at least substantially consistent throughout the lengths of the respective guide tracks 511, 512. For example, in such an exemplary configuration, the upper guide track 511 and the lower guide track 512 may embody distinct (e.g., unconnected) tracks that are each configured for engagement with a respective bottom panel.

Figure 4:
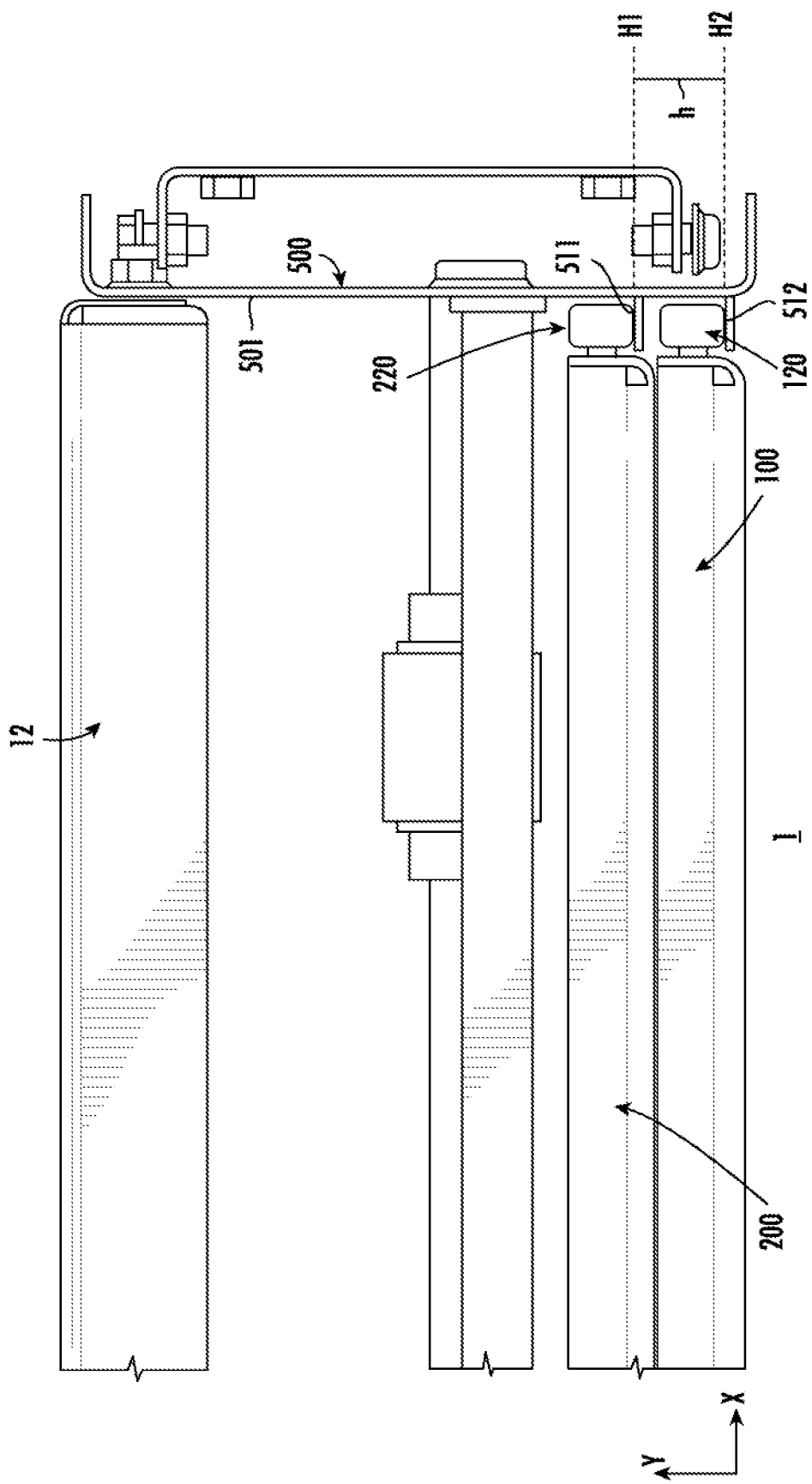
FIG. 4 illustrates a front cross-sectional view of an exemplary conveyor apparatus according to an exemplary embodiment described herein.

As an illustrative example, FIG. 4 illustrates a front cross-sectional view of an exemplary conveyor apparatus according to an example embodiment. In particular, FIG. 4 illustrates an exemplary conveyor apparatus 1 comprising a conveyor frame defined in part by a sidewall 500 comprising an upper guide track 511 and a lower guide track 512 extending along the inner surface 501 thereof. For example, as illustrated, the upper guide track 511 and the lower guide track 512 of a sidewall 500 may be arranged at different height positions (e.g., within different horizontal planes) along the height of the sidewall 500 such that the upper and lower guide tracks 511, 512 are vertically offset relative to one another. In particular, as shown, the lower guide track 512 is positioned at a lower guide track height H2 along the height of the sidewall 500 (e.g., as measured in the y-direction) that is different than the upper guide track height H1 defined by the height position of the upper guide track 511. For example, in various embodiments, a conveyor frame of an exemplary conveyor apparatus 1 may be defined at least in part by a vertical separation distance h between the lower guide track height H2 and the upper guide track height H1. As a non-limiting illustrative example, in various embodiments, the vertical separation distance h between the lower guide track height H2 and the upper guide track height H1 of exemplary upper and lower guide provided along a sidewall of a conveyor frame may be at least substantially between 5.0 mm and 50.0 mm (e.g., between 20.0 mm and 30.0 mm).

In various embodiments, an exemplary conveyor apparatus 1 may comprise a conveyor frame comprising a plurality of bottom panels positioned along the length of the conveyor apparatus 1 (e.g., along the lengths of the opposing sidewalls) that collectively define at least a portion of the bottom side of the conveyor apparatus, as described herein. For example, as illustrated in FIG. 4, the plurality of bottom panels may comprise a first bottom panel 100 and a second bottom panel 200, each having a respective set of sidewall engagement elements 120, 220 provided along a lateral side of the panel. As described herein, the sets of sidewall engagement elements 120, 220 of the first bottom panel 100 and the second bottom panel 200 may be configured for dynamic engagement with the lower guide track 512 and the upper guide track 511, respectively, which may be configured such that the second bottom panel 200 engaged with the upper guide track 511 may be selectively moved along the upper guide track 511 (e.g., in a length direction) independently of the first bottom panel 100, and vice versa. For example, in such an exemplary configuration, the second bottom panel 200 engaged with the upper guide track 511 may have a range of motion that is defined at least in part by the configuration of the upper guide track 511. Further, the first bottom panel 100 engaged with the lower guide track 512 may have a range of motion that is defined at least in part by the configuration of the lower guide track 512.

In various embodiments, as illustrated, the sidewall engagement elements 120 of the first bottom panel 100 may be positioned on the lower guide track 512 and the sidewall engagement elements 220 of the second bottom panel 200 may be positioned on the upper guide track 511 such that the first and second bottom panels 100, 200 are arranged at different height positions along the sidewall 500, as measured in the height direction (e.g., in the y-direction, as illustrated). For example, in various embodiments, the vertical separation distance h between an upper guard track 511 and a lower guard track 512 may be at least substantially greater than the height of an exemplary bottom panel engaged with the lower guard track 512 (e.g., the first bottom panel 100, as illustrated). In such an exemplary configuration, a top surface of the bottom panel engaged with the lower guard track 512 (e.g., the first bottom panel 100, as illustrated) may be positioned at least substantially below the upper guard track 511 (e.g., the bottom surface thereof) to provide a vertical clearance between the respective bottom panels engaged with the upper guard track 511 and the lower guard track 512 that facilitates movement of the bottom panels along the respective guard tracks without any physical interference caused by an adjacent bottom panel engaged with a different guide track.

As described herein, in various embodiments wherein the at least one guide track 510 of the second sidewall 500 comprises an upper guide track 511 and a lower guide track 512, as shown in FIG. 4, the conveyor frame may include a first sidewall wherein the at least one guide track provided along the inner surface thereof comprises an upper guide track and a lower guide track corresponding to the upper guide track 511 and the lower guide track 512, respectively. For example, the upper guide track and the lower guide track provided along the inner surface of the first sidewall may comprise an at least substantially mirrored configuration relative to the upper guide track 511 and the lower guide track 512, such that the first and second bottom panels 100, 200 engaged with the upper guide track 511 and the lower guide track 512, respectively, may also engage (e.g., via an opposing lateral side thereof) the corresponding upper guide track and lower guide track of the first sidewall to facilitate the moveable configuration of each bottom panel along the length of the conveyor apparatus 1.

Figure 5:
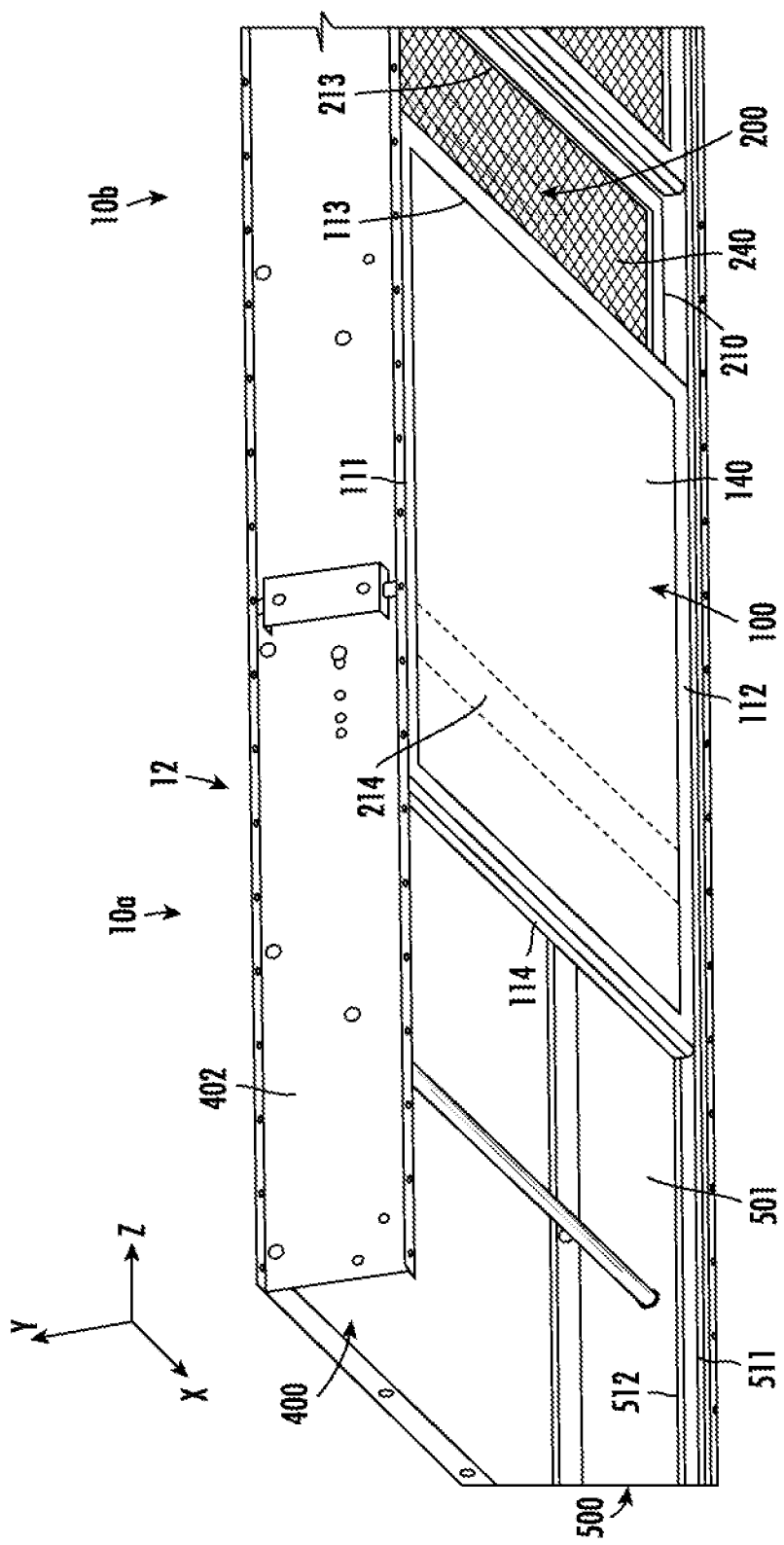
FIG. 5 illustrates a bottom perspective view of an exemplary conveyor apparatus according to an exemplary embodiment described herein.

FIG. 5 illustrates a bottom perspective view of an exemplary conveyor apparatus according to an example embodiment. In particular, FIG. 5 illustrates an exemplary conveyor apparatus 1 having a conveyor frame that comprises a plurality of bottom panels provided along a bottom side of the conveyor frame and dynamically engaged with each of the opposing sidewalls so as to be selectively moveable along the length of the sidewalls between a closed position and an open position. As illustrated, an exemplary conveyor apparatus 1 may comprise a plurality of bottom panels disposed at a bottom side of the conveyor frame and positioned in a consecutive arrangement along the length of the conveyor frame such that each of the plurality of bottom panels extends along a respective portion of the length of conveyor frame. For example, the respective portion of the length of conveyor frame along which a particular bottom panel extends may correspond to the nominal position of that bottom panel. Further, in an exemplary circumstance wherein each of the plurality of bottom panels is arranged in a closed position, as described herein, the plurality of bottom panels may be configured to extend along at least substantially the entire length of the conveyor frame such that the plurality of bottom panels provides coverage over at least substantially the entire opening defined along the bottom side of the conveyor frame.

As illustrated in FIG. 5, the plurality of bottom panels may comprise a first bottom panel 100 and a second bottom panel 200 embodying adjacent bottom panels. As described herein, adjacent bottom panels of a plurality of bottom panels may comprise two bottom panels of the plurality that define consecutive positions in the row of bottom panels arranged along the length of the conveyor frame. For example, the adjacent arrangement of a first bottom panel 100 and a second bottom panel 200 may be defined by the nominal positions of the respective bottom panels 100, 200 relative to one another, wherein the front frame element 113 of the first bottom panel 100 is positioned in at least substantially adjacent position along the length of the conveyor assembly relative to the rear frame element 214 of the second bottom panel 200.

As shown, the exemplary conveyor assembly 1 further comprises a conveyor frame having a first sidewall 400 and a second sidewall 500, each comprising a respective plurality of guide tracks configured to facilitate the dynamic configuration of each of the plurality of bottom panels 100, 200 relative to the first and second opposing sidewalls 400, 500. The second sidewall 500 comprises an upper guide track 511 and a lower guide track 512 provided along an inner surface 501 of the second sidewall 500, each extending along the length of the second sidewall 500 at a respective height position that is at least substantially adjacent the bottom sidewall portion of the sidewall 500. Further, as described herein, the first sidewall 400 comprises corresponding upper and lower guide tracks (not shown) comprising at least substantially mirrored configuration relative to the upper guide track 511 and the lower guide track 512 of the second sidewall 500. As shown, the first bottom panel 100 is arranged such that the second lateral side frame element 112 thereof is engaged with the lower guide track 512 and first lateral side frame element 111 thereof is engaged with the corresponding lower guide track provided along the inner surface of the first sidewall 400. In such an exemplary configuration, the first bottom panel 100 is configured to be selectively moveable in a length direction along the length of the conveyor assembly 1 at a height position that corresponds at least in part to the height position of the lower guide track 512 and the corresponding lower guide track of the first sidewall 400 (e.g., as defined along the height of the opposing sidewalls 400, 500). Further, as shown, the second bottom panel 200 may be arranged such that the second lateral side frame element 212 thereof is engaged with the upper guide track 511 and first lateral side frame element 211 thereof is engaged with the corresponding upper guide track provided along the inner surface of the first sidewall 400. In such an exemplary configuration, the second bottom panel 200 is configured to be selectively moveable in a length direction along the length of the conveyor assembly 1 at a height position that corresponds at least in part to the height position of the upper guide track 511 and the corresponding upper guide track of the first sidewall 400 (e.g., as defined along the height of the opposing sidewalls 400, 500).

As illustrated in FIG. 5, in various embodiments wherein an exemplary conveyor apparatus 1 comprises a plurality of bottom panels having at least two adjacent bottom panels, such as, for example, the first and second bottom panels 100, 200 of the exemplary conveyor apparatus 1, the adjacent bottom panels may be positioned so as to engage the first and second sidewalls 400, 500 at different sets of corresponding guide tracks that extend along the lengths of the sidewalls 400, 500 at respective height positions that are at least substantially different from one another. For example, a first adjacent bottom panel, such as, for example, the first bottom panel 100, being engaged with corresponding lower guide tracks of the sidewalls 400, 500 and a second adjacent bottom panel, such as, for example, the second bottom panel 200, being engaged with corresponding upper guide tracks of the sidewalls 400, 500 allows at least a portion of the plurality of bottom panels to be selectively moved along the length of the two opposing sidewalls 400, 500, such as, for example, from a closed position to an open position, as described herein, without physically abutting an adjacent bottom panel.

For example, as illustrated in FIG. 5, the offset arrangement of the adjacent first and second bottom panels 100, 200 at the lower guide tracks of the sidewalls 400, 500 and the upper guide tracks of the sidewalls 400, 500, respectively, enables the first bottom panel 100 to be moved from a closed position along the corresponding lower guide tracks of the first and second sidewalls 400, 500 in a length direction to an open position without abutting, engaging, and/or being restricted by the second bottom panel 200 adjacent thereto. As illustrated, the first bottom panel 100 may be selectively moved from the closed position to an open position such that at least a portion of the bottom side of the conveyor frame corresponding to a nominal position of the first bottom panel 100 is defined by an opening that is not covered by the plurality of bottom panels such that the interior of the conveyor apparatus may be accessed therethrough (e.g., by maintenance and/or service personnel). As further illustrated, in various embodiments, a first bottom panel 100 (e.g., of a consecutively arranged plurality of bottom panels) that is configured in an open position may be arranged at least partially overlapping configuration relative to the adjacent second bottom panel 200, as described herein, wherein at least a portion of the first bottom panel 100 provided in the open position is in a vertically stacked configuration relative to at least a portion of the adjacent second bottom portion 200. The first bottom panel 100 may be shifted, slid, translated, rolled, and/or otherwise moved along the corresponding lower guide tracks of the first and second sidewalls 400, 500 to an open position such that as the first bottom panel 100 moves to the open position, the front frame element 113 of the first bottom panel 100, initially disposed in a rearward position along the length of the conveyor assembly 1 relative to the rear frame element 214 of the second bottom panel 200, passes underneath the rear frame element 214 of the second bottom panel 200 to the illustrated exemplary open position in which the front frame element 113 is disposed in a frontward position along the length of the conveyor assembly 1 relative to the rear frame element 214 of the second bottom panel 200.

As a further illustrative example, FIGS. 6A and 6B illustrate side cross-sectional views of an exemplary conveyor apparatus according to an example embodiment described herein. In particular, FIG. 6A illustrates an exemplary conveyor apparatus 1 comprising a plurality of bottom panels arranged along a bottom side of the conveyor frame 11, each being configured in a closed position such that the plurality of bottom panels provides coverage over at least substantially the entire bottom side of the conveyor frame. Further, FIG. 6B illustrates an exemplary conveyor apparatus 1 comprising a plurality of bottom panels arranged along a bottom side of the conveyor frame 11, wherein one of the plurality of bottom panels is configured in an open position such that at least a portion of the bottom side of the conveyor frame is defined by an opening 13 that is not covered by the plurality of bottom panels through which the interior of the conveyor apparatus 1 may be accessed. The exemplary conveyor apparatus 1 illustrated in FIGS. 6A-6B comprises a first bottom panel 100 with a plurality of sidewall engagement elements 120 dynamically engaged with the lower guide track 412 of the first sidewall 400 and the corresponding lower guide track provided along an inner surface of an opposing second sidewall (not shown). Further, the exemplary conveyor apparatus 1 comprises a second bottom panel 200 having a plurality of sidewall engagement elements 220 dynamically engaged with the upper guide track 411 of the first sidewall 400 and the corresponding upper guide track provided along an inner surface of an opposing second sidewall (not shown). The adjacent first and second bottom panels 100, 200 may be arranged in an offset vertical configuration, as described herein, such that one or both of the first and second bottom panels 100, 200 may be moved from a closed position, along the respective guide tracks engaged therewith, to an open position without interfering with the configuration of the adjacent bottom panel.

As shown in FIG. 6A, in various embodiments wherein adjacent first and second bottom panels 100, 200 are each configured in a closed position, the consecutive arrangement of the first and second bottom panels 100, 200 along the length of the conveyor frame 11 (e.g., in the z-direction, as illustrated) may be embodied by the front frame element 113 of the rearward-positioned first bottom panel 100 being disposed in at least substantially adjacent position along a length of the conveyor assembly relative to the rear frame element 214 of the second bottom panel 200. In such an exemplary configuration, as described herein, the plurality of bottom panels may collectively provide an at least substantially continuous physical barrier that extends along the portion of the bottom side of the conveyor frame 11 defined along the cumulative lengths of the first and second bottom panels 100, 200. Further, as shown in FIG. 6B, one or more of the plurality of bottom panels, such as the second bottom panel 200 for purposes of illustrative example, that is arranged in the consecutive arrangement of the bottom panels along the length of the conveyor frame 11, as described herein, may be selectively shifted, slid, translated, rolled, and/or otherwise moved along the corresponding upper guide tracks of the first and second sidewalls 400, 500 from the closed position described above in reference to FIG. 6A, to an open position. As illustrated, in an exemplary configuration wherein the second bottom panel 200 is arranged in an open position, a portion of the bottom side of the conveyor frame 11 may be defined by an opening 13 embodying an area along the bottom side of the conveyor frame 11 that is not covered by the plurality of bottom panels, through which the interior of the conveyor apparatus 1 (e.g., mechanical and/or electrical components disposed beneath the conveyor surface 12) are made accessible to, for example, maintenance and/or service personnel, without requiring that one or more bottom panels of the conveyor frame 11 be detached, removed, and/or otherwise uninstalled from the conveyor frame 11. In various embodiments, the opening 13 provided at the bottom side of the conveyor frame 11 in response to the second bottom panel 200 being selectively moved to an open position may be defined at least in part by an opening length that corresponds to the distance in the length direction (e.g., in the z-direction, as illustrated) that was travelled by the second bottom panel 200 between the closed position and the open position.

Returning to the description of the exemplary bottom panel 100 illustrated in FIGS. 2A and 2B, an exemplary bottom panel 100 may comprise a bottom panel release element 131 that may be configurable between an engaged configuration and a disengaged configuration to selectively configure the bottom panel 100 between a fixed configuration and a dynamic configuration relative to the opposing sidewalls of the conveyor frame (e.g., in a length direction). For example, the bottom panel release element 131 may be selectively configured in an engaged configuration in order to constrain the movement of the bottom panel 100 in a length direction along the length of the conveyor apparatus and selectively fix the position of the bottom panel 100 along the length of the opposing sidewalls (e.g., along the guide tracks of the opposing sidewalls). Further, the bottom panel release element 131 may be selectively configured in a disengaged configuration in order to enable the dynamic configuration of the bottom panel 100, as described herein, wherein the bottom panel 100 may be moved along the length of the conveyor apparatus (e.g., in a length direction) relative to the opposing sidewalls engaged therewith based on the dynamic engagement of the bottom panel 100 (e.g., the plurality of sidewall engagement elements 121, 122) with the respective guide tracks of the opposing sidewalls. As non-limiting illustrative examples, in various embodiments, an exemplary bottom panel release element 131 may comprise a nut and bolt assembly, button, a latch assembly, a pin assembly, and/or the like, or any suitable means of selectively securing the bottom panel frame 110 relative to one or more of the opposing sidewalls and, based on user interaction therewith, releasing the bottom panel frame 110 to enable movement thereof in one or more length directions. For example, as illustrated in FIG. 2B, the exemplary bottom panel release element 131 may comprise a nut and bolt assembly including a bolt element 131b configured to adjustably and/or selectively engage each of a lateral side frame element of the bottom panel frame 110 and a sidewall of the conveyor frame and a nut component 131a engaged with the bolt component 131b at a portion of the bolt component 131b that is disposed laterally outward away from the lateral side frame element (e.g., the first lateral side frame element 111) through which the bolt element 131b extends. For example, such an exemplary the bottom panel release element 131 may be configured such that a user may interact with the nut component 131a (e.g., via an outer surface of a sidewall of the conveyor frame) so as to manipulate (e.g., loosen) the configuration of the bolt component 131b and cause the bolt component 131b to disengage the lateral side frame element of the bottom panel 100. Additionally, or alternatively, the bottom panel release element 131 may be configured such that a user may interact with the nut component 131a (e.g., via an outer surface of a sidewall of the conveyor frame) so as to tighten the configuration of the bolt component 131b and cause a bolt component 131b in a disengaged configuration to engage the lateral side frame element of the bottom panel 100 so as to restrict the movement between the bottom panel 100 and the sidewall of the conveyor frame in the length direction. In such an exemplary configuration, the bottom panel frame 110 may comprise a release element opening provided along the length of a lateral side frame element that may be configured to receive the bolt component 131b in order to configure the bottom panel release element 131 in an engaged configuration. For example, as illustrated, a release element opening extending in a lateral direction through a lateral side frame element may be positioned along the length of the lateral side frame element, such as, for example, at the frame element midpoint thereof.

In various embodiments, the bottom panel release element 131 may be positioned so as to be accessible to a user for selective reconfiguration via an outer surface of an opposing sidewall. For example, the bottom panel release element 131 may comprise an at least partially linear component that may be positioned to extend laterally through both a first lateral side frame element 111 of the bottom panel frame 110 and a first sidewall. The arrangement of the bottom panel release element 131 between an engaged configuration and a disengaged configuration may be defined by the engagement and/or disengagement of the bottom panel release element 131 with the bottom panel frame 110 (e.g., the first lateral side frame element 111) as the bottom panel release element 131 remains engaged with the first sidewall. For example, the bottom panel release element 131 may define an engaged configuration when the bottom panel 100 is in a closed position (e.g., a normal operating condition wherein the bottom panel 100 is positioned in a nominal position). The bottom panel release element 131 may extend laterally through both a first sidewall and a first lateral side frame element 111 of the bottom panel frame 110 such that the bottom panel 100 is prevented from being moved in a length direction away from the closed position (e.g., to an open position). Further, the bottom panel release element 131 may be selectively reconfigured from an engaged position to a disengaged configuration based at least in part on user interaction therewith, wherein the user causes the bottom panel release element 131 provided within the first sidewall to be removed from within the first lateral side frame element 111 (e.g., within a lateral orifice extending laterally therethrough) such that the bottom panel release element 131 disengages the bottom panel frame 110, thereby allowing the bottom panel 100 to move along the length of the conveyor apparatus relative to the first sidewall. For example, the bottom panel release element 131 may define a disengaged configuration when the bottom panel 100 is in an open position, wherein the bottom panel 100 has been moved in a length direction along the length of the conveyor apparatus (e.g., along the guide tracks engaged therewith) away from the nominal position thereof.

In various embodiments, as illustrated in FIG. 2A, an exemplary bottom panel 100 may comprise a plurality of bottom panel release elements, including a first bottom panel release element 131 configured for engagement with the first lateral side frame element 111 and a second bottom panel release element 132 configured for engagement with the second lateral side frame element 112. For example, in such an exemplary circumstance, the bottom panel 100 may be configured such that both the first bottom panel release element 131 and the second bottom panel release element 132 must be activated and/or reconfigured to a disengaged configuration in order to enable the dynamic configuration of the bottom panel 100 such that it may be selectively moved along the length of the conveyor assembly from a closed position to an open position.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A conveyor apparatus comprising:
    a conveyor frame embodying a structural support for a conveyor surface, the conveyor frame defining a conveyor length that extends in a length direction and comprising:
    a plurality of opposing sidewalls extending in the length direction, including a first sidewall defining a first lateral side of the conveyor frame and comprising a first guide track extending along a first inner surface thereof in the length direction, and a second sidewall defining a second lateral side of the conveyor frame and comprising a second guide track extending along a second inner surface thereof in the length direction; and
    a plurality of bottom panels, each provided beneath at least a portion of the conveyor surface and extending between the first sidewall and the second sidewall, wherein a first bottom panel of the plurality of bottom panels is engaged with both the first guide track of the first sidewall and the second guide track of the second sidewall such that the first bottom panel is configured to be selectively moveable throughout a first range of motion that is defined at least in part by the first guide track and the second guide track; and
    wherein the first guide track comprises a first bottom surface extending in a first laterally inward direction at least substantially perpendicularly from the first inner surface of the first sidewall, and the second guide track comprises a second bottom surface extending in a second laterally inward direction at least substantially perpendicularly from the second inner surface of the second sidewall; wherein the first laterally inward direction and the second laterally inward direction are at least substantially opposite directions.

2. The conveyor apparatus of claim 1, wherein the first sidewall further comprises a third guide track extending along the first inner surface thereof in the length direction and the second sidewall further comprises a fourth guide track extending along the second inner surface thereof in the length direction; and wherein a second bottom panel of the plurality of bottom panels is engaged with both the third guide track of the first sidewall and the fourth guide track of the second sidewall such that the second bottom panel is configured to be selectively moveable throughout a second range of motion that is defined at least in part by the third guard track and the fourth guide track.

3. The conveyor apparatus of claim 2, wherein the first guide track and the second guide track define an upper set of guide tracks that are each positioned at a first height position defined along a height of the opposing sidewalls, and wherein the third guide track and the fourth guide track define a lower set of guide tracks that are each positioned at a second height position defined along the height of the opposing sidewalls; wherein the upper set of guide tracks and the lower guide tracks are separated by a vertical separation distance.

4. The conveyor apparatus of claim 3, wherein the upper set of guide tracks and the lower set of guide tracks are arranged in an at least substantially parallel configuration such that the first range of motion of the first bottom panel and the second range of motion of the second bottom panel do not intersect.

5. The conveyor apparatus of claim 3, wherein the first bottom panel and the second bottom panel define adjacent bottom panels consecutively arranged along the conveyor length.

6. The conveyor apparatus of claim 3, wherein a third bottom panel of the plurality of bottom panels is engaged with both the first guide track of the first sidewall and the second guide track of the second sidewall such that the third bottom panel is configured to be selectively moveable throughout a third range of motion that is defined at least in part by the first guard track and the second guide track; wherein the third range of motion comprises an at least substantially coplanar confirmation relative to the first range of motion of the first bottom panel.

7. The conveyor apparatus of claim 1, further comprising a bottom panel release element that is configured for selectively reconfiguring the first bottom panel between a fixed configuration and a dynamic configuration.

8. The conveyor apparatus of claim 7, wherein the bottom panel release element is arranged along the conveyor frame so as to be accessible for adjustment between an engaged configuration and a disengaged configuration via a first outer surface of the first sidewall.

9. The conveyor apparatus of claim 8, further comprising a second bottom panel release element that is configured for selectively reconfiguring the first bottom panel between the fixed configuration and the dynamic configuration, wherein the second bottom panel release is arranged along the conveyor frame so as to be accessible for adjustment via a second outer surface of the second sidewall.

10. The conveyor apparatus of claim 1, wherein the conveyor frame defines an intermediate conveyor section of the conveyor apparatus.

11. The conveyor apparatus of claim 1, wherein the first range of motion is defined in the length direction along respective lengths of the first sidewall and the second sidewall.

12. The conveyor apparatus of claim 1, wherein the first guard track is defined at least in part by a first track length and the second guard track is defined at least in part by a second track length, the first and second track lengths each being at least substantially parallel to the conveyor surface.

13. The conveyor apparatus of claim 1, wherein the first guard track and the second guard track comprise an at least substantially mirrored configuration relative to one another.

14. The conveyor apparatus of claim 1, wherein the plurality of bottom panels further comprise a plurality of sidewall engagement elements configured to facilitate dynamic engagement of the first bottom panel with the first guide track and the second guide track, and wherein each of the plurality of sidewall engagement elements is configured to engage one of the first guide track and the second guide track.

15. The conveyor of claim 14, wherein the plurality of sidewall engagement elements comprises a first set of sidewall engagement elements disposed along a first lateral side of the first bottom panel and configured for engaging the first guide track, and a second set of sidewall engagement elements disposed along a second lateral side of the first bottom panel and configured for engaging the second guide track.

16. The conveyor apparatus of claim 14, wherein each of the plurality of sidewall engagement elements comprises a roller element configured to define a rolling engagement of the respective sidewall engagement element along the respective one of the first guide track and the second guide track engaged therewith.

17. The conveyor apparatus of claim 1, wherein the first guide track comprises a side surface extending in an at least substantially upward vertical direction from the first bottom surface, the side surface being configured to at least partially constrain a lateral range of motion of the first bottom panel relative to the first sidewall.

18. The conveyor apparatus of claim 1, wherein the first bottom panel is configured for bi-direction movement relative to the first sidewall and the second sidewall in both a first length direction and a second length direction defined along the conveyor length, the first length direction and the length inward direction defining at least substantially opposite directions.

19. The conveyor apparatus of claim 1, wherein the first bottom panel comprises a bottom panel frame comprising an at least substantially rectangular configuration.

\* \* \* \* \*